(12) United States Patent
Osakabe et al.

(10) Patent No.: US 9,936,094 B2
(45) Date of Patent: *Apr. 3, 2018

(54) IMAGE READING APPARATUS

(71) Applicant: Brother Kogyo Kabushiki Kaisha, Nagoya-shi, Aichi-ken (JP)

(72) Inventors: Yoshinori Osakabe, Seto (JP); Hiromi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,907

(22) Filed: Apr. 28, 2017

(65) Prior Publication Data
US 2017/0237872 A1 Aug. 17, 2017

Related U.S. Application Data

(63) Continuation of application No. 15/085,273, filed on Mar. 30, 2016, now Pat. No. 9,654,662, which is a (Continued)

(30) Foreign Application Priority Data
Oct. 3, 2011 (JP) .................. 2011-219220

(51) Int. Cl.
H04N 1/10 (2006.01)
H04N 1/00 (2006.01)

(52) U.S. Cl.
CPC ....... H04N 1/1043 (2013.01); H04N 1/00525 (2013.01); H04N 1/00795 (2013.01);
(Continued)

(58) Field of Classification Search
USPC ........................................... 358/497
See application file for complete search history.

(56) References Cited

U.S. PATENT DOCUMENTS 4,870,502 A 9/1989 Dreinhoff et al.
5,610,731 A * 3/1997 Itoh .................. H04N 1/031
358/474

(Continued)

FOREIGN PATENT DOCUMENTS

CN 1416261 A 5/2003
CN 101552857 A 10/2009
(Continued)

OTHER PUBLICATIONS

European Patent Office, European Search Report for European Patent Application No. 12186024.1, dated Mar. 8, 2013.
(Continued)

*Primary Examiner* — Ngon Nguyen
(74) *Attorney, Agent, or Firm* — Baker Botts L.L.P.

(57) ABSTRACT

An image reading apparatus includes: a contact glass provided at an upper surface of a main body of the apparatus to set a manuscript thereon, an image sensor being positioned below the contact glass and having a reading surface on contact glass side for reading an image from the manuscript on the contact glass, a carriage supporting the image sensor accommodated in a sensor container formed to have a recess open to the contact glass side, a rail member slidably supporting the carriage, and a biasing member biasing the image sensor to the contact glass side via a biased portion adjacent to the reading surface of the image sensor. An upper end of the biasing member is positioned below the contact glass and above the lower surface of the image sensor.

16 Claims, 11 Drawing Sheets

Related U.S. Application Data continuation of application No. 14/881,149, filed on Oct. 12, 2015, now Pat. No. 9,451,117, which is a continuation of application No. 14/525,006, filed on Oct. 27, 2014, now Pat. No. 9,160,880, which is a continuation of application No. 13/627,868, filed on Sep. 26, 2012, now Pat. No. 8,873,115.

(52) U.S. Cl.
CPC .......... *H04N 1/103* (2013.01); *H04N 1/1017* (2013.01); *H04N 1/1061* (2013.01); *H04N 2201/0094* (2013.01)

(56) References Cited

U.S. PATENT DOCUMENTS

| | | | |
|---|---|---|---|
| 5,778,277 | A | 7/1998 | Wenthe, Jr. et al. |
| 6,285,441 | B1 | 9/2001 | Takahara |
| 6,453,140 | B1 | 9/2002 | Hsu |
| 6,717,702 | B1 | 4/2004 | Yamauchi et al. |
| 6,903,849 | B2 | 6/2005 | Yokota |
| 6,952,292 | B2 | 10/2005 | Takeuchi et al. |
| 7,218,427 | B2 | 5/2007 | Hirayama |
| 7,557,967 | B2 | 7/2009 | Amimoto et al. |
| 7,605,955 | B2 | 10/2009 | Kakuta |
| 7,924,475 | B2 | 4/2011 | Suzuki |
| 7,978,380 | B2 | 7/2011 | Ohama et al. |
| 8,159,725 | B2 | 4/2012 | Cummings et al. |
| 8,817,344 | B2 | 8/2014 | Takahara |
| 9,131,102 | B2 | 9/2015 | Osakabe et al. |
| 9,160,880 | B2 * | 10/2015 | Osakabe .............. H04N 1/1017 |
| 2001/0040705 | A1 | 11/2001 | Yokota |
| 2001/0043371 | A1 * | 11/2001 | Takahara ................. H04N 1/03 358/471 |
| 2002/0054380 | A1 | 5/2002 | Takeuchi et al. |
| 2003/0142370 | A1 | 7/2003 | Hanashi et al. |
| 2004/0012823 | A1 | 1/2004 | Hendrix et al. |
| 2004/0061908 | A1 | 4/2004 | Cheng |
| 2005/0270593 | A1 | 12/2005 | Ma |
| 2007/0002397 | A1 | 1/2007 | Osakabe et al. |
| 2007/0002398 | A1 | 1/2007 | Ohama et al. |
| 2007/0047023 | A1 | 3/2007 | Oguri et al. |
| 2007/0109613 | A1 | 5/2007 | Sakakibara |
| 2007/0146817 | A1 | 6/2007 | Osakabe |
| 2007/0153336 | A1 | 7/2007 | Sheng et al. |
| 2007/0165289 | A1 | 7/2007 | Osakabe |
| 2008/0175640 | A1 | 7/2008 | Akiyama |
| 2008/0304114 | A1 | 12/2008 | Wu et al. |
| 2009/0034022 | A1 | 2/2009 | Tamai |
| 2009/0244652 | A1 * | 10/2009 | Osakabe .............. H04N 1/1017 358/474 |
| 2010/0328736 | A1 | 12/2010 | Ozawa |
| 2011/0075229 | A1 | 3/2011 | Fujiwara |
| 2012/0236374 | A1 | 9/2012 | Takahara |
| 2013/0083371 | A1 | 4/2013 | Osakabe et al. |
| 2013/0083375 | A1 | 4/2013 | Osakabe et al. |
| 2015/0043045 | A1 | 2/2015 | Osakabe et al. |
| 2016/0037013 | A1 | 2/2016 | Osakabe et al. |

FOREIGN PATENT DOCUMENTS

| | | |
|---|---|---|
| JP | H01-293755 A | 11/1989 |
| JP | H07-193689 A | 7/1995 |
| JP | H08-163291 A | 6/1996 |
| JP | H11-069106 A | 3/1999 |
| JP | H11-289430 A | 10/1999 |
| JP | 2003-179726 A | 6/2003 |
| JP | 2003-222955 A | 8/2003 |
| JP | 2007-027863 A | 2/2007 |
| JP | 2007-043683 A | 2/2007 |
| JP | 2007-067810 A | 3/2007 |
| JP | 2007-110466 A | 4/2007 |
| JP | 2008-154111 A | 7/2008 |
| JP | 2010-258543 A | 11/2010 |
| JP | 2011-077873 A | 4/2011 |

OTHER PUBLICATIONS

State Intellectual Property Office of the People's Republic of China, First Office Action for Chinese Patent Application No. 20120365224.3, dated Jul. 30, 2014.
Japan Patent Office, Notice of Reasons for Rejection for Japanese Patent Application No. 2011-219220, dated Mar. 24, 2015.
State Intellectual Property Office of the People's Republic of China, The First Office Action for Chinese Patent Application No. 201210365263.3, dated Jul. 28, 2014.
European Patent Office, European Search Report for European Patent Application No. 12185771.8, dated Feb. 4, 2014.
United States Patent and Trademark Office, Office Action issued in U.S. Appl. No. 14/846,283, dated Oct. 22, 2015.
Yoshiaki, Abstract of JPH01293755(A), Nov. 27, 1989, Machine Translation of Japanese Patent Application Abstract listed on IDS, JPH01293755, All Pages.
United States Patent and Trademark Office, Notice of Allowance issued in U.S. Appl. No. 14/846,283, dated Dec. 7, 2016.
United States Patent and Trademark Office, Non-Final Office Action issued in U.S. Appl. No. 14/846,283, dated Jun. 2, 2016.
United States Patent and Trademark Office, Corrected Notice of Allowance issued in U.S. Appl. No. 14/846,283, dated Jan. 10, 2017.
Japan Patent Office, Notice of Reasons for Rejection issued for Japanese Patent Application No. 2015-104259, dated Jul. 19, 2016.
United States Patent and Trademark Office, Non-Final Office Action issued in U.S. Appl. No. 15/085,273, dated Sep. 12, 2016.
United States Patent and Trademark Office, Notice of Allowance issued in U.S. Appl. No. 15/085,273, dated Dec. 21, 2016.
United States Patent and Trademark Office, Notice of Allowance issued in U.S. Appl. No. 15/085,273, dated Feb. 10, 2017.
United States Patent and Trademark Office, Non-Final Office Action issued in U.S. Appl. No. 14/525,006, dated Jan. 23, 2015.
United States Patent and Trademark Office, Office Action issued in U.S. Appl. No. 14/881,149, dated Jan. 22, 2016.
United States Patent and Trademark Office, Notice of Allowance issued in U.S. Appl. No. 14/881,149, dated May 26, 2016.
United States Patent and Trademark Office, Notice of Allowances and Fee(s) Due, issued in U.S. Appl. No. 15/475,707, dated May 22, 2017.

* cited by examiner

Fig. 1
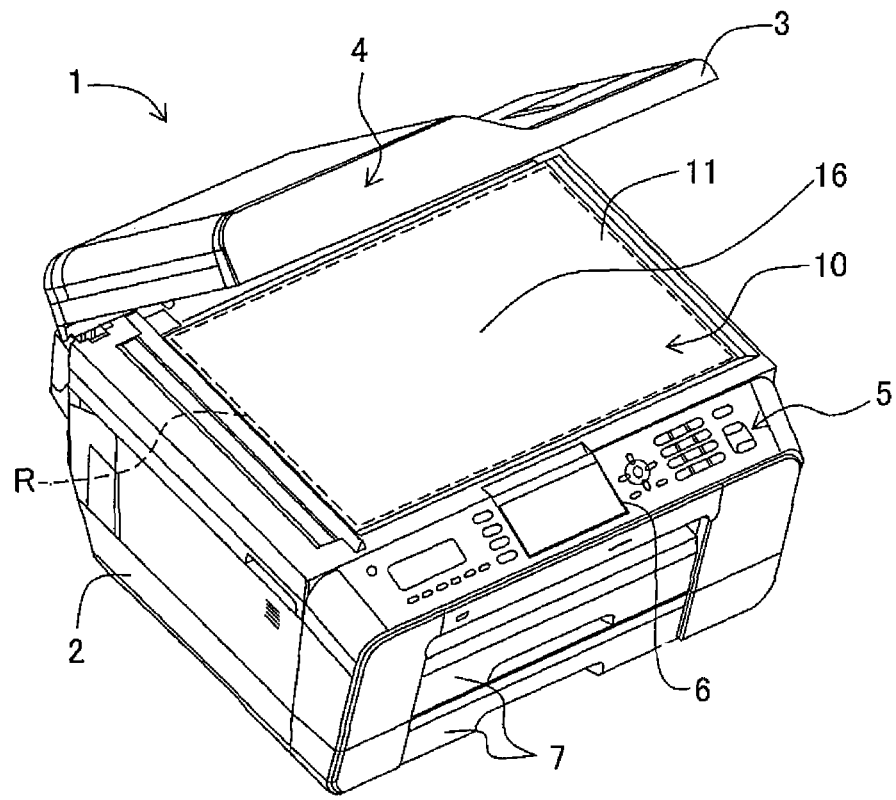
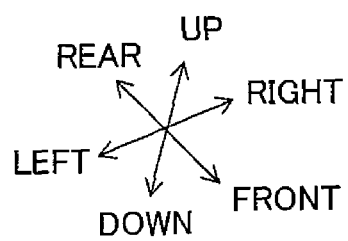

Fig. 2
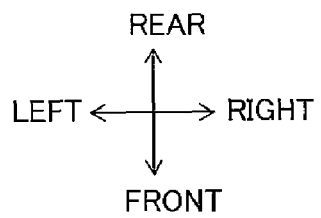
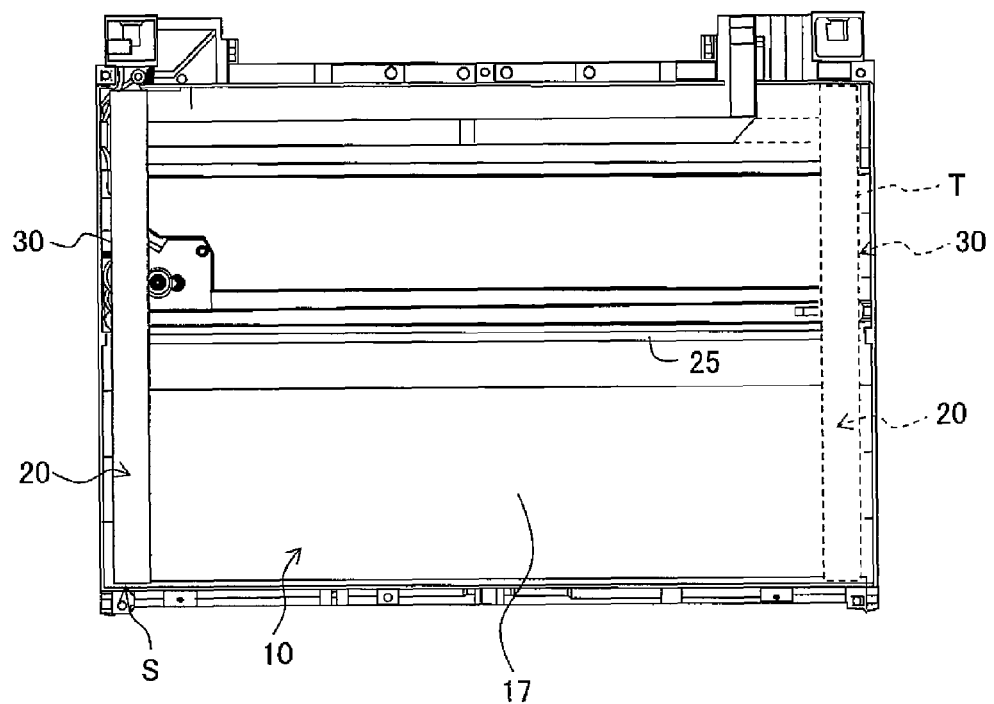

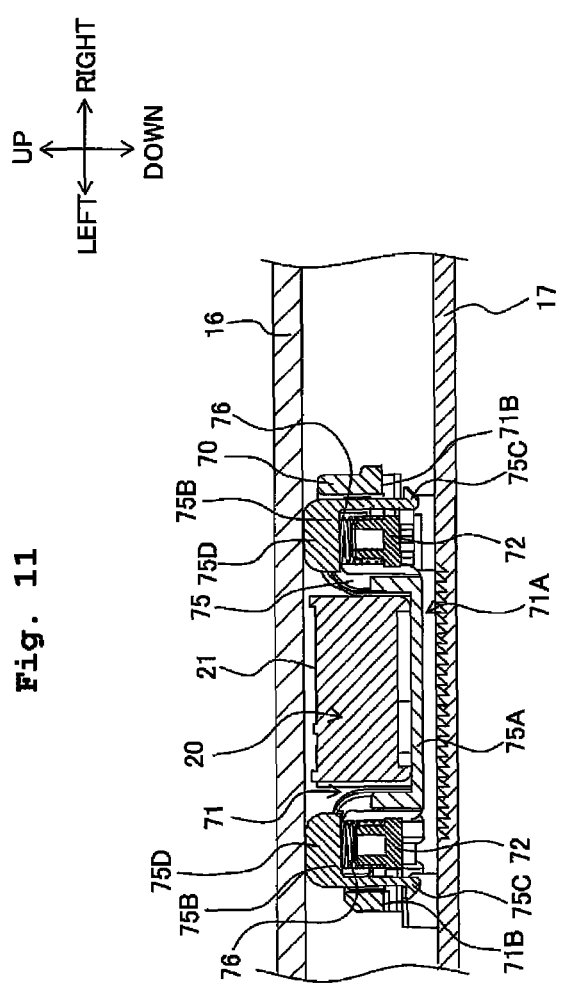

IMAGE READING APPARATUS

CROSS REFERENCE TO RELATED APPLICATIONS

The present application is a continuation of U.S. patent application Ser. No. 15/085,273, filed on Mar. 30, 2016; which is a continuation of U.S. patent application Ser. No. 14/881,149, filed on Oct. 12, 2015, now U.S. Pat. No. 9,451,117 B2, issued on Sep. 20, 2016; which is a continuation of U.S. patent application Ser. No. 14/525,006, filed on Oct. 27, 2014, now U.S. Pat. No. 9,160,880 B2, issued on Oct. 13, 2015; which is a continuation of U.S. patent application Ser. No. 13/627,868, filed on Sep. 26, 2012, now U.S. Pat. No. 8,873,115 B2, issued on Oct. 28, 2014; which claims priority from Japanese Patent Application No. 2011-219220, filed on Oct. 3, 2011, the disclosures of each of which are incorporated herein by reference in their entirety.

BACKGROUND OF THE INVENTION

Field of the Invention

The present invention relates to an image reading apparatus which is configured to read an image from a manuscript on a contact glass by an image sensor contained in a carriage.

Description of the Related Art

Conventionally, as image reading apparatuses, so-called flatbed type image reading apparatuses have been known. Such an image reading apparatus has a contact glass at the upper surface of its main body for setting a manuscript. The image reading apparatus is configured to read an image of the manuscript set on the contact glass by an image sensor provided inside the main body. Then, the image sensor is installed on a carriage which is set to be slidable on a rail provided inside the main body. The image sensor is configured to slide along the rail together with the carriage when reading the image of the manuscript.

The invention disclosed in Japanese Patent Application Laid-Open No. 08-163291 is known as an invention with respect to such image reading apparatuses described above. In the image reading apparatus disclosed in Japanese Patent Application Laid-Open No. 08-163291, the image sensor is placed on the carriage which is slidable along the rail. The image sensor is biased upward toward the contact glass by springs provided between the lower surface of the image sensor and the upper surface of the carriage.

Here, in the image reading apparatus disclosed in Japanese Patent Application Laid-Open No. 08-163291, the springs are provided between the lower surface of the image sensor and the upper surface of the carriage. Therefore, even if the springs are compressed to the limit, the springs still occupy a certain height. Therefore, the springs which occupy the certain height become an obstacle to the apparatus miniaturization which has been desired in recent years.

SUMMARY OF THE INVENTION

Accordingly, the present invention relates to image reading apparatuses which is configured to read an image from a manuscript on a contact glass by an image sensor contained in a carriage, and an object of the present invention is to provide an image reading apparatus capable of biasing the image sensor toward the contact glass by biasing means while facilitating miniaturization of the apparatus.

An image reading apparatus according to an aspect of the present invention includes a contact glass, an image sensor, a carriage, a rail member, and a biasing member, and is capable of reading an image from a manuscript set on the contact glass by sliding the image sensor, which is accommodated in a sensor container of the carriage, together with the carriage along the rail member. In the image reading apparatus according to the aspect of the present invention, because the biasing member biases the image sensor toward the contact glass via a biased portion adjacent to a reading surface of the image sensor which is accommodated in the sensor container, the biasing member is not positioned between a lower surface of the image sensor and a bottom surface of the sensor container. By virtue of this, it is possible for the image reading apparatus to facilitate miniaturization of the apparatus in its vertical direction. Further, because an upper end of the biasing member is positioned below the contact glass and above the lower surface of the image sensor, the image reading apparatus can reliably bias the image sensor toward the contact glass by the biasing force of the biasing member.

BRIEF DESCRIPTION OF THE DRAWINGS

FIG. 1 is a perspective external view of a multifunction apparatus according to a first embodiment of the present invention.

FIG. 2 is a plan view showing an inner structure of a scanner unit of the multifunction apparatus.

FIG. 11 is a cross-sectional view of a holder member attached to the fifth carriage.

DESCRIPTION OF THE PREFERRED EMBODIMENTS

Figure 3:
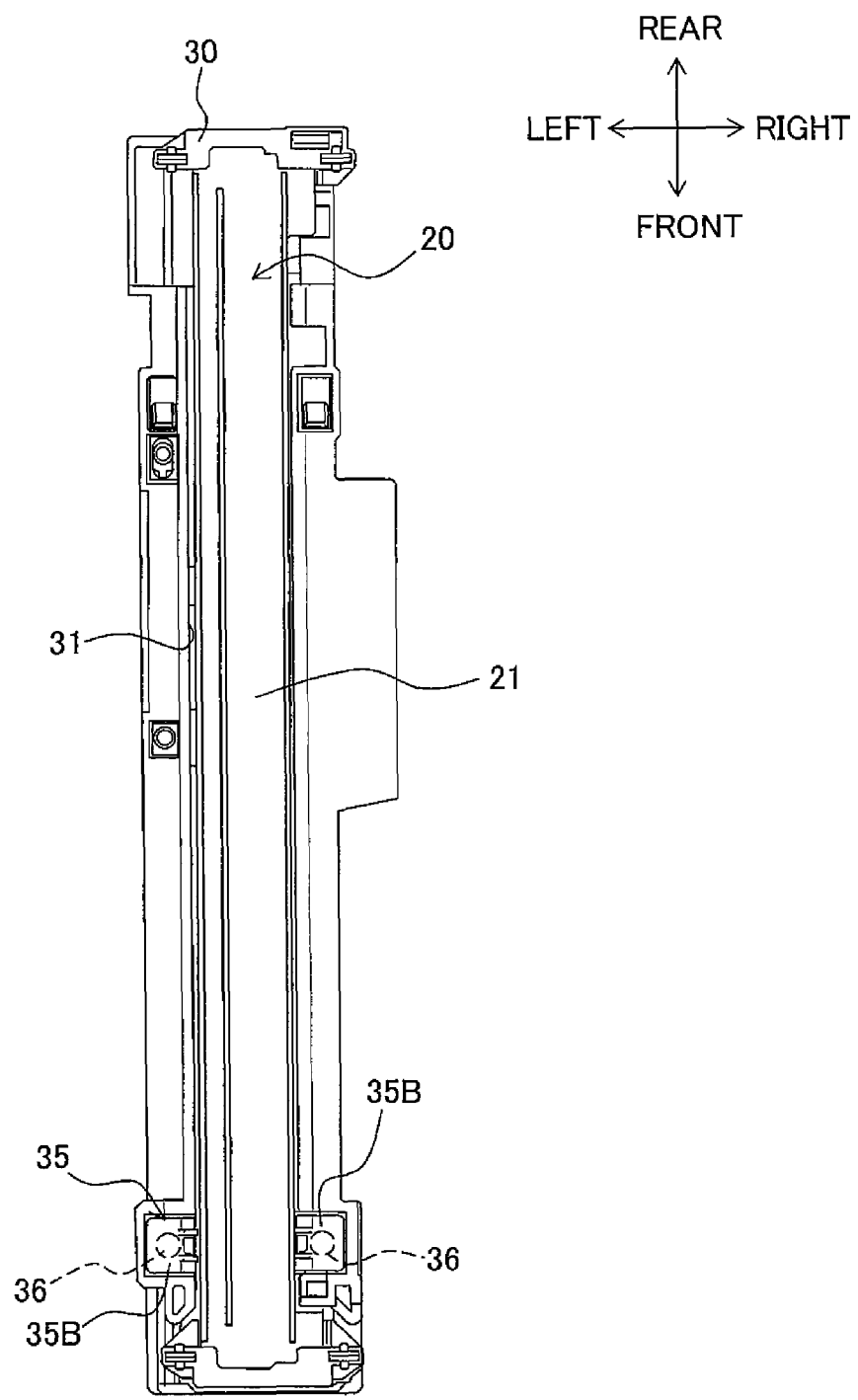
FIG. 3 is a plan view of an image sensor installed on a first carriage of the multifunction apparatus.

Hereinbelow, referring to the accompanying drawings, explanations will be made in detail with respect to several embodiments in which an image reading apparatus according to the present invention is embodied as a multifunction apparatus 1 having a scanner unit 10.

First Embodiment

First, referring to FIGS. 1 and 2, a schematic configuration of the multifunction apparatus 1 according to first embodiment will be explained. In the following explanations, with the multifunction apparatus 1 placed in a usable state as a reference, the up-down directions are defined as shown in FIG. 1. The lower right side in FIG. 1 is defined as the front side of the multifunction apparatus 1, and the upper left side in FIG. 1 is defined as the rear side of the multifunction apparatus 1. Further, with the multifunction apparatus 1 viewed from the front side as a reference in left-right direction, the lower left side in FIG. 1 is defined as the left side of the multifunction apparatus 1, and the upper right side is defined as the right side of the multifunction apparatus 1.

As shown in FIG. 1, the multifunction apparatus 1 has a main body 2 and a top cover 3. The main body 2 has a manuscript table 11 on an upper surface thereof. The manuscript table 11 has a contact glass 16. The contact glass 16 is a so-called "platen glass". The contact glass 16 is formed to have a rectangular shape slightly larger than maximum size of the manuscript which the multifunction apparatus 1 can read. A long side of the contact glass 16 is positioned along the left-right direction of the main body 2. The contact glass 16 is used when the manuscript is set on the contact glass 16 and an image is read by moving an aftermentioned image sensor 20 which constitutes a scanner unit 10.

Further, the main body 2 has the scanner unit 10 below the contact glass 16, namely, in an upper part of inner space of the main body 2. The scanner unit 10 has the image sensor 20, a first carriage 30, a slide shaft 25, a reading transport motor, a flat cable, and the like. The scanner unit 10 reads an image of the manuscript set on the contact glass 16. The configuration of the scanner unit 10 will be explained in detail hereinafter in reference to the relevant figures.

Then, the main body 2 contains a control section, a facsimile section, an image formation section and the like below the scanner unit 10. The control section has a CPU, ROM, RAM, and the like. The control section plays a central role of the control for the multifunction apparatus 1 to realize a scanner function, a photocopy function, a printer function, and a facsimile function.

The facsimile section transmits the manuscript image read by the scanner unit 10 to the destination desired by a user via a network based on the control by the control section. Further, the facsimile section can receive facsimile data via the network. The control section controls the image formation section to print the received facsimile data on a sheet of printing paper or the like in a paper feed cassette 7. That is, the multifunction apparatus 1 realizes the facsimile function by controlling the scanner unit 10, the facsimile section, and the image formation section.

The image formation section prints the inputted image data onto the printing paper transported from the paper feed cassette 7 based on the control by the control section. The multifunction apparatus 1 controls the image formation section to process the image data corresponding to the image read by the scanner unit 10, thereby realizing the photocopy function. Further, the multifunction apparatus 1 controls the image formation section to process the print data inputted via the network, thereby realizing the printer function.

Further, an operation panel 5 and a liquid crystal display 6 are provided on the upper surface on the front side of the main body 2. The operation panel 5 is manipulated to input various instructions to the multifunction apparatus 1. The liquid crystal display 6 displays various kinds of information about the multifunction apparatus 1 to inform the user of the contents of the information.

Further, the paper feed cassette 7 is installed to be insertable and removable through the front surface of the main body 2. The paper feed cassette 7 accommodates sheets of the printing paper as a recording medium in a stacked state. The printing paper is used to print the image formed by the image formation section.

Then, the top cover 3 is provided to be openable and closeable with the rear-end edge of the upper surface of the main body 2 as the axis. When the top cover 3 is closed, the top cover 3 covers the upper surface of the main body 2, i.e. the manuscript table 11 and the contact glass 16. Therefore, the top cover 3 can fix the manuscript, which is set on the contact glass 16, at that position.

Further, the top cover 3 has an auto document feeder 4 (ADF). The auto document feeder 4 is provided on the left side of the top cover 3. The auto document feeder 4 feeds the manuscripts in a manuscript tray (not shown) one by one consecutively and, after transporting the manuscripts along a predetermined transport path, discharges the manuscripts to a paper discharge tray (not shown). The multifunction apparatus 1 can read the image of the manuscript in a manner in which the scanner unit 10 reads the image in the course of transporting the manuscript by the auto document feeder 4.

Next, referring to FIG. 2, explanations will be made in detail with respect to a configuration of the scanner unit 10 of the multifunction apparatus 1. As described above, the scanner unit 10 has the image sensor 20, the first carriage 30, the slide shaft 25, the reading transport motor, the flat cable, and the like. The scanner unit 10 is provided below the contact glass 16 in the upper part of the main body 2. Further, in the first embodiment, the portion, in the main body 2, at which the scanner unit 10 is provided is parted by a scanner bottom surface 17 from a portion in which the facsimile section, the image formation section and the like are accommodated.

The image sensor 20 is configured by a so-called contact image sensor (CIS). The image sensor 20 reads the image of the manuscript positioned on the contact glass 16. The image sensor 20 has a reading surface 21 including an imaging element and the like at its upper surface positioned on the side of the contact glass 16. The image sensor 20 has a reading range with a length equivalent to the short side of the maximum manuscript size in the main scanning direction, i.e. the front-rear direction with respect to the main body 2. Further, the image sensor 20 is formed to have an approximately cuboid shape and to extend in the main scanning direction. The image sensor 20 is contained in an aftermentioned sensor container 31 of the first carriage 30.

As shown in FIG. 2, the slide shaft 25 is a shaft member having a circular rod form. The slide shaft 25 is provided over or above the scanner bottom surface 17 to extend toward the left and right directions of the main body 2. The slide shaft 25 supports the image sensor 20 to be slidable in the left-right direction via the first carriage 30. Then, based on the driving control by the control section, the reading transport motor can slide the image sensor 20 which is installed on the first carriage 30 along the slide shaft 25 via a driving force transmission mechanism such as a pulley belt mechanism and the like.

Figure 5:
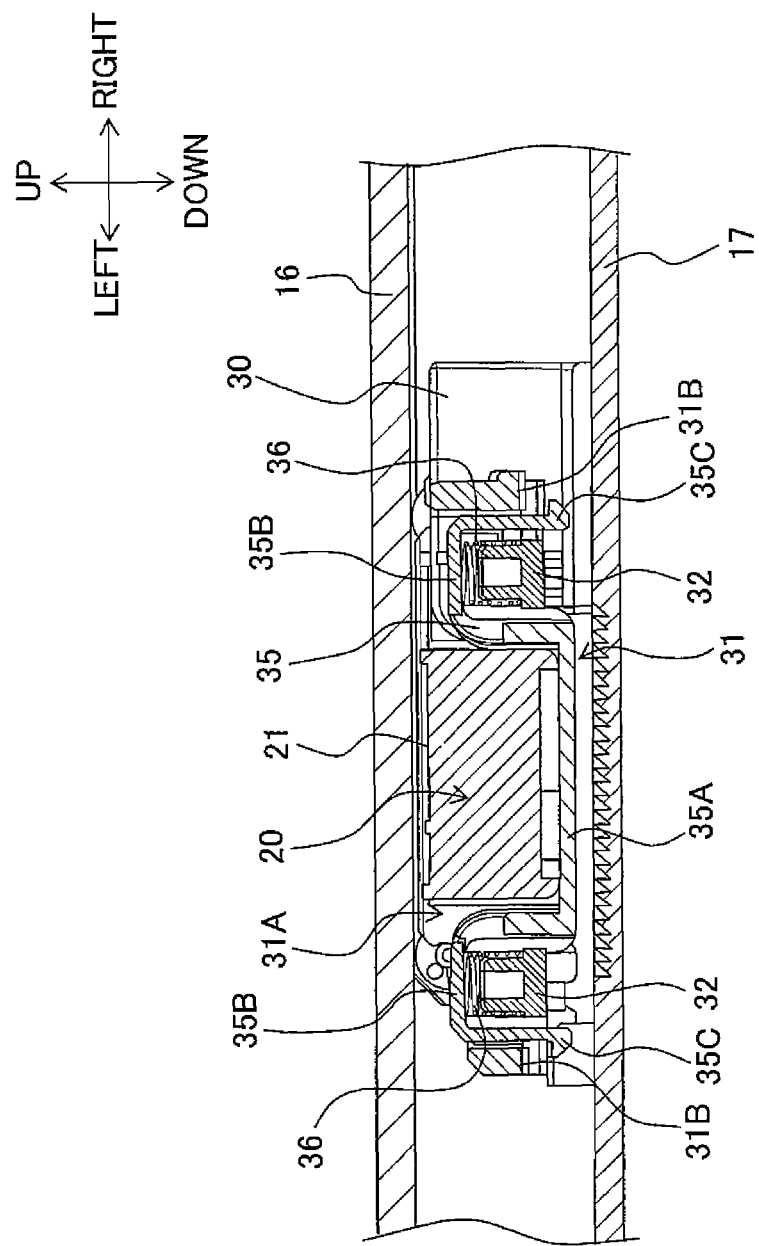
FIG. 5 is a cross-sectional view of a holder member attached to the first carriage.

Then, in the multifunction apparatus 1, the image sensor 20 is usually located in a so-called home position, i.e. a standby position S under the left end portion of the contact glass 16. As shown in FIGS. 2 and 5, the image sensor 20 can slide along the lower surface of the contact glass 16 from the standby position S up to a position at a distance equivalent to the long side of the maximum manuscript size (to be referred to as "terminal position T" hereinbelow).

The image sensor 20 reads an image from the manuscript set on the contact glass 16 when the image sensor 20 is moved between the standby position S and the terminal position T along a secondary scanning direction parallel to the left-right direction of the multifunction apparatus 1.

Therefore, as shown in FIG. 1, the scanner unit 10 has the maximum reading range R corresponding to the maximum-sized manuscript and can read an image of any manuscript which is not larger than the maximum manuscript size.

Next, referring to FIGS. 3 to 5, explanations will be made in detail with respect to a configuration of the first carriage 30 supporting the image sensor 20 in the scanner unit 10 according to the first embodiment. As described above, the first carriage 30 supports the image sensor 20 from below and supports the image sensor 20 to be slidable along the slide shaft 25 in the secondary scanning direction.

Figure 4:
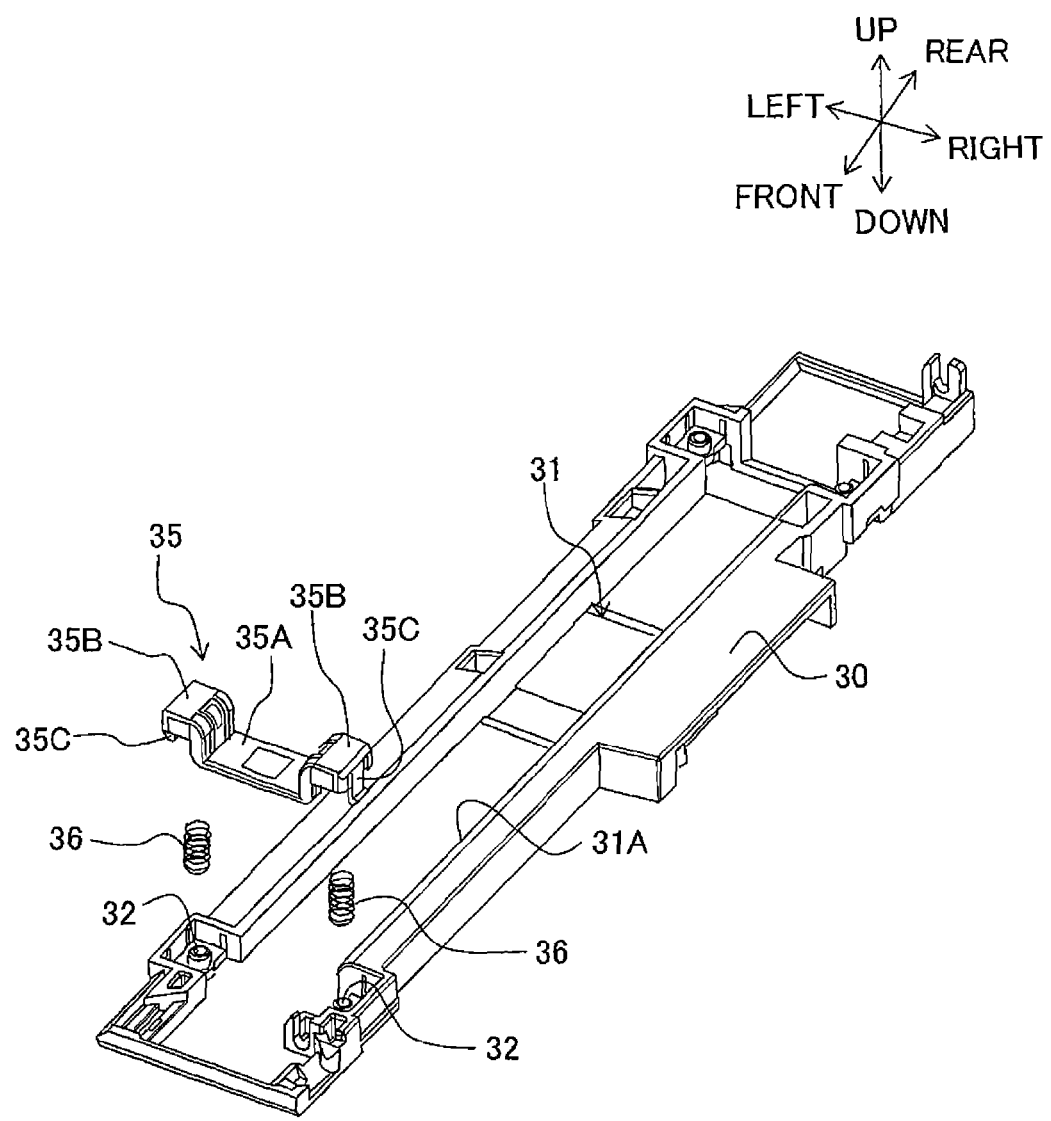
FIG. 4 is a perspective external view showing a structure of the first carriage.

As shown in FIGS. 3 and 4, the first carriage 30 includes the sensor container 31, and spring attachment portions 32. The first carriage 30 extends in the front-rear direction of the multifunction apparatus 1. The sensor container 31 is formed to have a recess which is open to the contact glass 16, and configured as a groove extending along the front-rear direction of the multifunction apparatus 1. The sensor container 31 contains the image sensor 20 so that the reading surface 21 of the image sensor 20 faces upward, i.e. toward the contact glass 16. The sensor container 31 supports the image sensor 20 from below.

The spring attachment portions 32 are formed on the end portions in the longitudinal direction of the first carriage 30 positioned on the front side of the multifunction apparatus 1. The spring attachment portions 32 are configured to be capable of attachment of a holder member 35 and springs 36. As shown in FIGS. 3 to 5, the spring attachment portions 32 are adjacent to the sensor container 31 and face each other in the secondary scanning direction of the multifunction apparatus 1 so that the sensor container 31 is sandwiched therebetween.

As shown in FIG. 4, the sensor container 31 has an opening 31A on a side of an end portion of the first carriage 30. The opening 31A is formed to penetrate the bottom of the sensor container 31 which is positioned on the side of the end portion provided with the spring attachment portions 32 within a certain range, i.e. an area from the central portion up to the end portion side in the longitudinal direction. Therefore, the end portion of the image sensor 20 contained in the sensor container 31 is movable downward below the first carriage 30 via the opening 31A.

As shown in FIGS. 4 and 5, the holder member 35 supports the image sensor 20 contained in the sensor container 31 from below. The holder member 35 holds the springs 36 between the holder member 35 and the spring attachment portions 32. The holder member 35 has a sensor support portion 35A, biased portions 35B, and locking hooks 35C.

As shown in FIG. 5, similar to the sensor container 31, the sensor support portion 35A is formed to have a recess which is open upward. The sensor support portion 35A supports the lower surface of the image sensor 20 contained in the sensor container 31. Further, under a condition that the holder member 35 is attached to the sensor container 31, the sensor support portion 35A traverses the opening 31A in the secondary scanning direction at the position of forming the spring attachment portions 32.

The biased portions 35B are formed to extend horizontally in outward directions with respect to the sensor support portion 35A from the two upper ends of the sensor support portion 35A formed to have a recess which is open upward. The biased portions 35B retain the end portions of the springs 36 attached to the spring attachment portions 32, respectively. As shown in FIG. 5, under a condition that the holder member 35 is attached to the first carriage 30, the biased portions 35B are positioned above the spring attachment portions 32, respectively. The biased portions 35B are biased upward by the springs 36 attached to the spring attachment portions 32, respectively.

Further, the locking hooks 35C are hooks extending downward from the end edges of the respective biased portions 35B positioned outside of the sensor support portion 35A. The locking hooks 35C have claw portions at the lower end portions to project toward outside, respectively. Then, by engagement with engagement holes 31B formed in the first carriage 30, the locking hooks 35C fulfill the function of retaining the holder member 35 to prevent the holder member 35 from coming off the first carriage 30.

As shown in FIG. 5, the engagement holes 31B are formed by cutting away the lower portions of the side walls of the first carriage 30 on the left and right at the spring attachment portions 32, respectively. Under a condition that the holder member 35 is attached to the first carriage 30, the claw portions of the locking hooks 35C enter into the engagement holes 31B. Therefore, if the holder member 35 moves upward by the biasing force of the springs 36, then the claw portions of the locking hooks 35C come into contact with the upper ends of the engagement holes 31B. By these contacts, the holder member 35 is retained in place without coming off the first carriage 30, and thereby it is possible to prevent loss of the holder member 35.

The springs 36 are provided between the biased portions 35B of the holder member 35 and the spring attachment portions 32, respectively. The upper ends of the springs 36 make contact with the lower surfaces of the biased portions 35B. The lower ends of the springs 36 are retained on the spring attachment portions 32. As shown in FIG. 5, the upper ends of the springs 36 are positioned below the contact glass 16 and above the lower surface of the image sensor 20 contained in the sensor container 31. Further, the spring attachment portions 32 retaining the lower ends of the springs 36 are positioned above the lower surface of the image sensor 20 in the sensor container 31. Therefore, between the biased portions 35B of the holder member 35 and the spring attachment portions 32, the springs 36 can bias the image sensor 20 along with the holder member 35 upward to the contact glass 16.

As explained above, in the multifunction apparatus 1 of the first embodiment, on the side of the end portion of the first carriage 30, the two biased portions 35B constituting the holder member 35 are adjacent to the reading surface 21 of the image sensor 20 in the sensor container 31 in the left-right direction. Then, between the respective biased portions 35B and spring attachment portions 32, the springs 36 bias the biased portions 35B of the holder member 35 upward. Here, the image sensor 20 is supported from below by the sensor support portion 35A of the holder member 35. Therefore, the image sensor 20 is biased toward the contact glass 16 by the biasing force of the springs 36 exerted on the biased portions 35B of the holder member 35.

Further, as shown in FIG. 3, when viewed from upside of the reading surface 21 of the image sensor 20 in the sensor container 31, the biased portions of the present invention are adjacent to the reading surface 21. That is, as long as this condition is satisfied, the biased portions may be positioned at any position in the up-down direction with respect to the reading surface 21 of the image sensor 20. For example, as long as the above condition is satisfied, the biased portions may be positioned either above the reading surface 21 or below the reading surface 21. Further, the biased portions may also be at the same height with the reading surface 21.

As shown in FIGS. 3 to 5, in the first embodiment, the springs 36 are not ever positioned between the lower surface of the image sensor 20 and the sensor container 31. Therefore, it is possible for the multifunction apparatus 1 to reduce the vertical dimension of the image sensor 20 and first carriage 30. Further, the springs 36 bias the image sensor 20 to the contact glass 16 via the biased portions 35B adjacent to the reading surface 21 of the image sensor 20 in the secondary scanning direction. Therefore, the multifunction apparatus 1 can utilize the space in the first carriage 30 adjacent to the sensor container 31 in the secondary scanning direction to bias the image sensor 20 toward the contact glass 16. That is, it is possible for the multifunction apparatus 1 to facilitate miniaturization of the apparatus in the vertical direction and to bias the image sensor 20 toward the contact glass 16.

Further, as shown in FIG. 5, the two biased portions 35B of the holder member 35 are adjacent to the reading surface 21 of the image sensor 20 in the sensor container 31 in the left-right direction. The two biased portions 35B are biased upward by the springs 36. That is, according to the multifunction apparatus 1, it is possible to balance the biasing force of the springs 36 for the image sensor 20 in the left-right direction. Therefore, it is possible to bias the reading surface 21 of the image sensor 20 toward the contact glass 16 in an appropriate state, i.e., being kept in a horizontal state.

Second Embodiment

Next, referring to the relevant figures, explanations will be made in detail with respect to a second embodiment. Further, a multifunction apparatus 1 according to the second embodiment basically has the same configuration with the multifunction apparatus 1 according to the first embodiment, but differs in the configurations of the carriage and the holder member of the scanner unit 10. Hence, explanations will be omitted for the same configuration as in the first embodiment.

Figure 6:
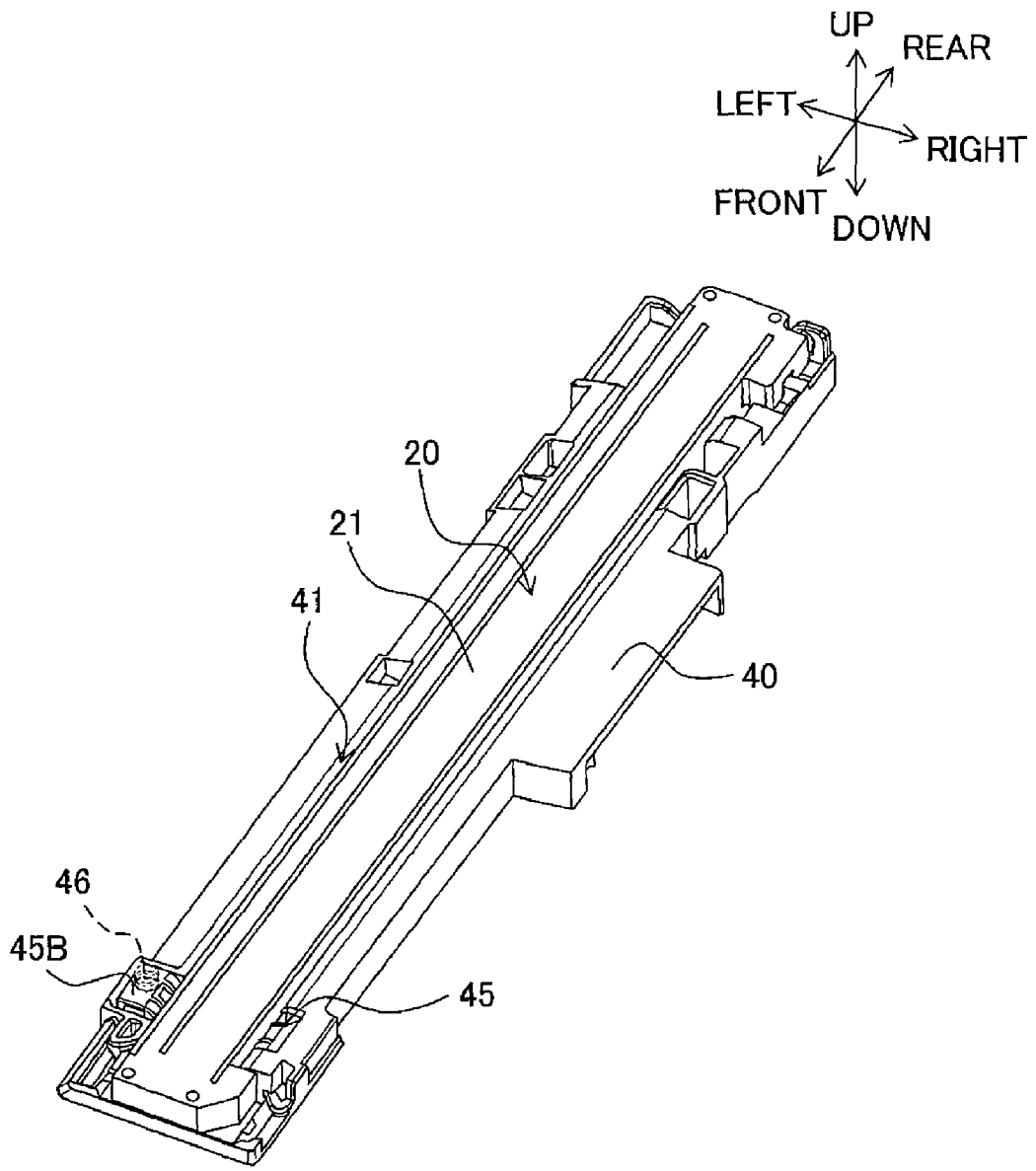
FIG. 6 is a perspective external view of the image sensor installed on a second carriage according to a second embodiment of the present invention.
Figure 7:
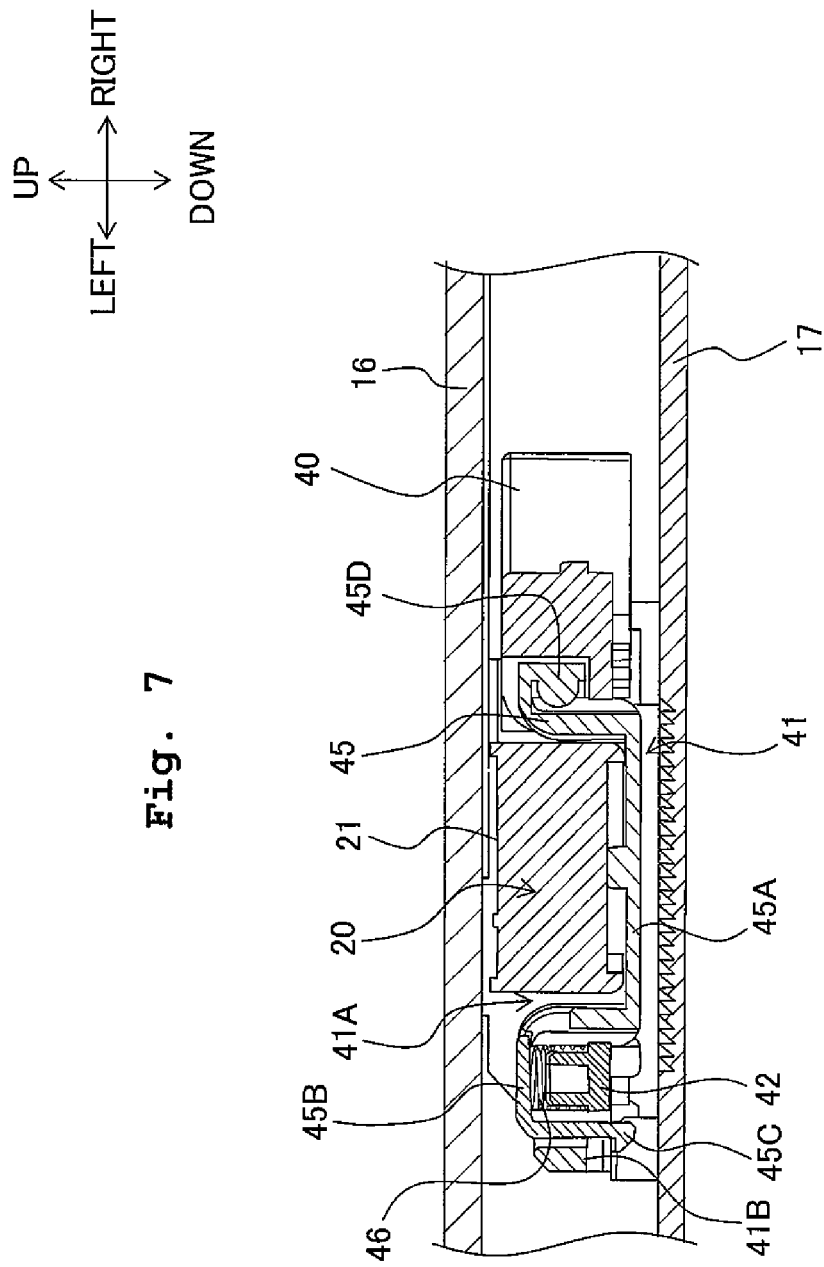
FIG. 7 is a cross-sectional view of a holder member attached to the second carriage.

Referring to FIGS. 6 and 7, explanations will be made in detail with respect to configurations of a carriage (to be referred to as a "second carriage 40" below) and a holder member 45 according to the second embodiment. Similar to the aforementioned first carriage 30, the second carriage 40 supports the image sensor 20 from below and supports the image sensor 20 to be slidable along the slide shaft 25 in the secondary scanning direction.

As shown in FIGS. 6 and 7, the second carriage 40 includes a sensor container 41, and a spring fitting portion 42. The second carriage 40 extends in the front-rear direction of the multifunction apparatus 1. The sensor container 41 has an opening 41A. The sensor container 41 has the same configuration with the sensor container 31 of the first carriage 30 in the first embodiment. Accordingly, explanations will be omitted for the configurations of the sensor container 41 and the opening 41A.

Further, the spring fitting portion 42 is formed in the end portion in the longitudinal direction of the second carriage 40 positioned on the front side of the multifunction apparatus 1. The spring fitting portion 42 is configured to be capable of attachment of the holder member 45 and a spring 46. As shown in FIG. 7, the spring fitting portion 42 is adjacent to the left side of the sensor container 41 in the secondary scanning direction of the multifunction apparatus 1.

Similar to the first embodiment, the holder member 45 in the second embodiment supports the image sensor 20 contained in the sensor container 41 from below. The holder member 45 holds the spring 46 between the holder member 45 and the spring fitting portion 42. Here, as shown in FIGS. 6 and 7, the holder member 45 has a sensor support portion 45A, a biased portion 45B, a locking hook 45C, and a revolving retainment portion 45D. Since the sensor support portion 45A has the same configuration with the aforementioned sensor support portion 35A of the first carriage 30, the explanation of which will be omitted.

In the holder member 45 according to the second embodiment, the biased portion 45B is formed to extend horizontally in an outward direction with respect to the sensor support portion 45A from the left upper end of the sensor support portion 45A formed to have a recess which is open upward. The biased portion 45B retains the end portion of the spring 46 attached to the spring fitting portion 42. As shown in FIG. 7, under a condition that the holder member 45 is attached to the second carriage 40, the biased portion 45B is positioned above the spring fitting portion 42. The biased portion 45B is biased upward by the spring 46 attached to the spring fitting portion 42.

Further, the locking hook 45C is a hook extending downward from the left end edge of the biased portion 45B. The locking hook 45C has a claw portion at the lower end portion to project toward outside. Then, by engagement with an engagement hole 41B formed in the second carriage 40, the locking hook 45C fulfills the function of retaining the holder member 45 to prevent the holder member 45 from coming off the second carriage 40.

As shown in FIG. 7, the revolving retainment portion 45D is formed to extend in an outward direction with respect to the sensor support portion 45A from the right upper end of the sensor support portion 45A. The revolving retainment portion 45D retains the holder member 45 so that the holder member 45 can revolve upward with respect to the second carriage 40 about the revolving retainment portion 45D.

The spring 46 is provided between the biased portion 45B of the holder member 45 and the spring fitting portion 42. The upper end of the spring 46 makes contact with the lower surface of the biased portion 45B. The lower end of the spring 46 is retained on the spring fitting portion 42. As shown in FIG. 7, the upper end of the spring 46 is positioned below the contact glass 16 and above the lower surface of the image sensor 20 contained in the sensor container 41. Further, the spring fitting portion 42 retaining the lower end of the spring 46 is positioned above the lower surface of the image sensor 20 in the sensor container 41. Accordingly, between the biased portion 45B of the holder member 45 and the spring fitting portion 42, the spring 46 can bias the image sensor 20 upward along with the holder member 45.

As explained above, in the multifunction apparatus 1 of the second embodiment, on the end portion side of the second carriage 40, the biased portion 45B of the holder member 45 is adjacent to left side of the reading surface 21 of the image sensor 20 in the sensor container 41. Then, between the biased portion 45B and spring fitting portion 42, the spring 46 biases the biased portion 45B of the holder member 45 upward. Further, the holder member 45 is retained so that the holder member 45 can revolve about the revolving retainment portion 45D by the revolving retainment portion 45D formed in the right-side portion of the sensor support portion 45A. Here, the image sensor 20 is supported from below by the sensor support portion 45A of the holder member 45. Therefore, the image sensor 20 is biased toward the contact glass 16 by the biasing force of the spring 46 exerted on the biased portion 45B of the holder member 45.

As shown in FIG. 7, also in the second embodiment, the spring 46 is not positioned between the lower surface of the image sensor 20 and the sensor container 41. Accordingly, it is possible for the multifunction apparatus 1 to reduce the vertical dimension of the image sensor 20 and second carriage 40. Further, the spring 46 biases the image sensor 20 to the contact glass 16 via the biased portion 45B adjacent to the reading surface 21 of the image sensor 20 in the secondary scanning direction. Accordingly, the multifunction apparatus 1 can utilize the space in the second carriage 40 adjacent to the sensor container 41 in the secondary scanning direction to bias the image sensor 20 toward the contact glass 16. That is, it is possible for the multifunction apparatus 1 to facilitate miniaturization of the apparatus in the vertical direction and to bias the image sensor 20 toward the contact glass 16.

Third Embodiment

Next, referring to the relevant figures, explanations will be made in detail with respect to a third embodiment. Further, a multifunction apparatus 1 according to the third embodiment basically has the same configuration with the multifunction apparatus 1 according to the first embodiment or the second embodiment, but differs in the configurations of the carriage and the holder member of the scanner unit 10. Hence, explanations will be made only for those differences in reference to the relevant figures, but omitted for the same configuration as in the first embodiment or the second embodiment.

Figure 8:
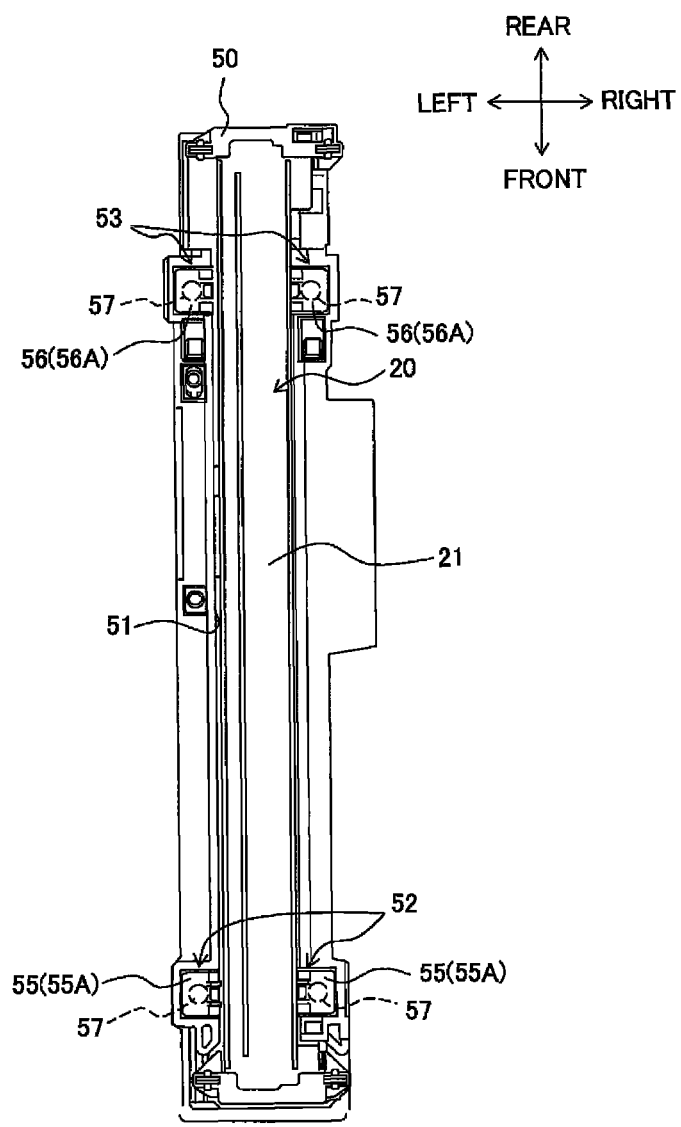
FIG. 8 is a plan view of the image sensor installed on a third carriage according to a third embodiment of the present invention.

Referring to FIG. 8 and the like, explanations will be made in detail with respect to configurations of a carriage (to be referred to as a "third carriage 50" below), a first holder member 55 and a second holder member 56 according to the third embodiment. Similar to the aforementioned first carriage 30 and second carriage 40, the third carriage 50 supports the image sensor 20 from below and supports the image sensor 20 to be slidable along the slide shaft 25 in the secondary scanning direction.

As shown in FIG. 8, the third carriage 50 includes a sensor container 51, first spring attachment portions 52, and second spring attachment portions 53. The third carriage 50 extends in the front-rear direction of the multifunction apparatus 1. Further, the sensor container 51 has the same configuration with the sensor container 31 of the first carriage 30 in the first embodiment. Accordingly, explanations will be omitted for the configuration of the sensor container 51.

Further, the first spring attachment portions 52 are formed on one end portion in the longitudinal direction of the third carriage 50 positioned on the front side of the multifunction apparatus 1. The first spring attachment portions 52 are configured to be capable of attachment of the first holder member 55 and springs 57. As shown in FIG. 8, the first spring attachment portions 52 are adjacent to the sensor container 51 and face each other in the secondary scanning direction of the multifunction apparatus 1 so that the sensor container 51 is sandwiched therebetween.

Further, the second spring attachment portions 53 are formed on the other end portion in the longitudinal direction of the third carriage 50 positioned on the rear side of the multifunction apparatus 1. The second spring attachment portions 53 are configured to be capable of attachment of the second holder member 56 and other springs 57. As shown in FIG. 8, the second spring attachment portions 53 are adjacent to the sensor container 51 and face each other in the secondary scanning direction of the multifunction apparatus 1 so that the sensor container 51 is sandwiched therebetween.

In the third embodiment, the first holder member 55 and the second holder member 56 support the image sensor 20 contained in the sensor container 51 from below on both end portions in the longitudinal direction of the image sensor 20, respectively. The first holder member 55 holds the springs 57 between the first spring attachment portions 52 and the first holder member 55 and the second holder member 56 holds the springs 57 between the second spring attachment portions 53 and the second holder member 56.

Similar to the holder member 35 according to the first embodiment, the first holder member 55 has a sensor support portion, biased portions 55A, and locking hooks. Further, also similar to the holder member 35 according to the first embodiment, the second holder member 56 has a sensor support portion, biased portions 56A, and locking hooks.

Since the first holder member 55 and the second holder member 56 have the same configuration with the aforementioned holder member 35 according to the first embodiment, their explanations will be omitted. Further, the aspect of attachment of the first holder member 55 to the first spring attachment portions 52, as well as the aspect of attachment of the second holder member 56 to the second spring attachment portions 53, is the same as that of the attachment of the holder member 35 to the spring attachment portions 32 as explained in the first embodiment in reference to FIG. 5. Therefore, the explanations for those aspects will also be omitted.

As explained above, in the multifunction apparatus 1 of the third embodiment, on both end portion sides in the main scanning direction of the third carriage 50, the biased portions 55A of the first holder member 55 and the biased portions 56A of the second holder member 56 are adjacent to the reading surface 21 of the image sensor 20 in the sensor container 51 in the left-right direction. Then, between the respective biased portions 55A and first spring attachment portions 52, the springs 57 bias the biased portions 55A of the first holder member 55 upward. Further, between the respective biased portions 56A and second spring attachment portions 53, the other springs 57 bias the biased portions 56A of the second holder member 56 upward.

Here, the image sensor 20 is supported from below by the sensor support portions of the first holder member 55 and the second holder member 56. Accordingly, the image sensor 20 is biased toward the contact glass 16 by the biasing force of the springs 57 exerted on the first holder member 55 and the second holder member 56. That is, in the third embodiment, in both end portions of the image sensor 20 in the main scanning direction, the biasing force of the springs 57 is exerted on the image sensor 20 via the first holder member 55 and the second holder member 56. Therefore, it is possible for the multifunction apparatus 1 to bias the image sensor 20 toward the contact glass 16 in the optimum state, i.e., being kept in a horizontal state with respect to the main scanning direction of the image sensor 20.

In the third embodiment, the springs 57 are not positioned between the lower surface of the image sensor 20 and the sensor container 51. Accordingly, it is possible for the multifunction apparatus 1 to reduce the vertical dimension of the image sensor 20 and third carriage 50. Further, the springs 57 bias the image sensor 20 to the contact glass 16 via the biased portions 55A and biased portions 56A adjacent to the reading surface 21 of the image sensor 20 in the secondary scanning direction. Accordingly, the multifunction apparatus 1 can utilize the space in the third carriage 50 adjacent to the sensor container 51 in the secondary scanning direction to bias the image sensor 20 toward the contact glass 16. That is, it is possible for the multifunction apparatus 1 to facilitate miniaturization of the apparatus in the vertical direction while biasing the image sensor 20 toward the contact glass 16.

Further, as shown in FIG. 8, the two biased portions 55A of the first holder member 55 and the two biased portions 56A of the second holder member 56 are adjacent to the reading surface 21 of the image sensor 20 in the sensor container 51 in the left-right direction, respectively. The two biased portions 55A and the two biased portions 56A are biased upward by the springs 57, respectively. That is, according to the multifunction apparatus 1, it is possible to balance the biasing force of the springs 57 for the image sensor 20 in the left-right direction. Accordingly, it is possible to bias the reading surface 21 of the image sensor 20 toward the contact glass 16 in an appropriate state, i.e., being kept in a horizontal state also with respect to the secondary scanning direction.

Fourth Embodiment

Next, referring to the relevant figures, explanations will be made in detail with respect to a fourth embodiment. A multifunction apparatus 1 according to the fourth embodiment basically has the same configuration with the multifunction apparatus 1 according to any of the first embodiment to the third embodiment, but differs in the configurations of the carriage and the holder member of the scanner unit 10. Hence, explanations will be made only for those differences in reference to the relevant figures, but omitted for the same configuration as in any of the first embodiment to the third embodiment.

Figure 9:
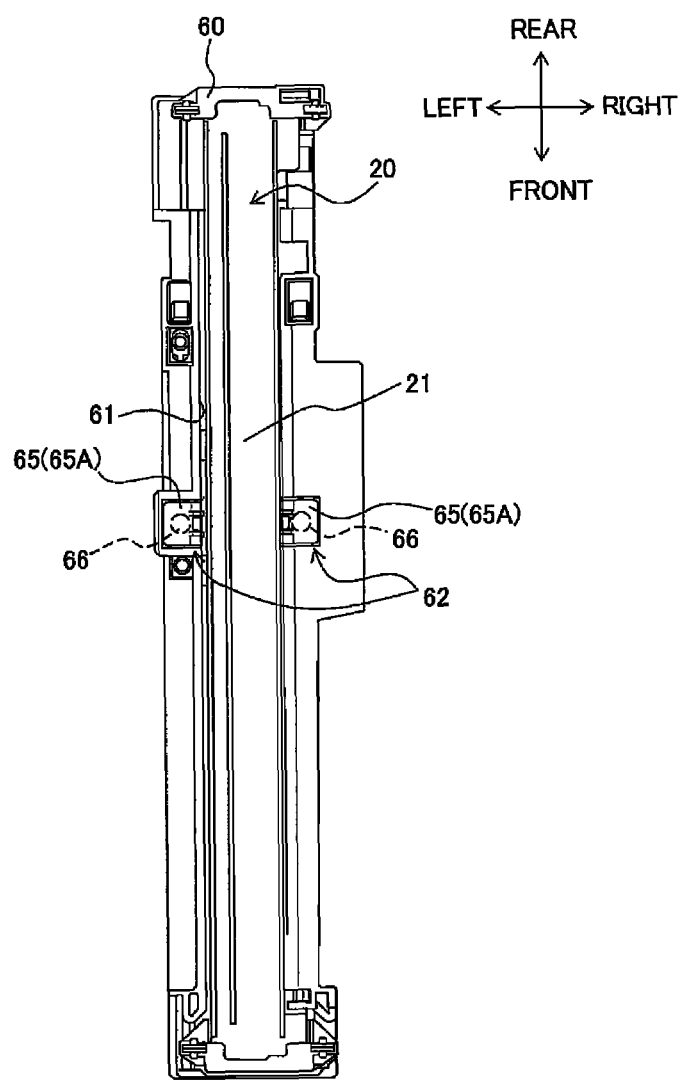
FIG. 9 is a plan view of the image sensor installed on a fourth carriage according to a fourth embodiment of the present invention.

Referring to FIG. 9 and the like, explanations will be made in detail with respect to configurations of a carriage (to be referred to as a "fourth carriage 60" below) and a holder member 65 according to the fourth embodiment. Similar to the aforementioned first carriage 30, second carriage 40 and third carriage 50, the fourth carriage 60 supports the image sensor 20 from below. The fourth carriage 60 supports the image sensor 20 to be slidable along the slide shaft 25 in the secondary scanning direction.

As shown in FIG. 9, the fourth carriage 60 includes a sensor container 61 and spring attachment portions 62. The fourth carriage 60 extends in the front-rear direction of the multifunction apparatus 1. Further, the sensor container 61 has the same configuration with the sensor container 31 of the first carriage 30 in the first embodiment. Accordingly, explanations will be omitted for the configuration of the sensor container 61.

Further, the spring attachment portions 62 are formed in the central portion in the longitudinal direction of the fourth carriage 60. The spring attachment portions 62 are configured to be capable of attachment of the holder member 65 and springs 66. As shown in FIG. 9, the spring attachment portions 62 are adjacent to the sensor container 61 and face each other in the secondary scanning direction of the multifunction apparatus 1 so that the sensor container 61 is sandwiched therebetween.

In the fourth embodiment, the holder member 65 supports the image sensor 20 contained in the sensor container 61 from below on the central portion in the longitudinal direction of the image sensor 20. The holder member 65 holds the springs 66 between the holder member 65 and the spring attachment portions 62. Similar to the holder member 35 according to the first embodiment, the holder member 65 has a sensor support portion, biased portions 65A, and locking hooks.

Since the holder member 65 has the same configuration with the aforementioned holder member 35 according to the first embodiment, the explanation of which will be omitted. Further, the aspect of attachment of the holder member 65 to the spring attachment portions 62 is the same as that of attachment of the holder member 35 in the first embodiment. Therefore, the explanation for that aspect will also be omitted.

As explained above, in the multifunction apparatus 1 of the fourth embodiment, in the central portion in the main scanning direction of the fourth carriage 60, the biased portions 65A of the holder member 65 are adjacent to the reading surface 21 of the image sensor 20 in the sensor container 61 in the left-right direction. Then, between the respective biased portions 65A and spring attachment portions 62, the springs 66 bias the biased portions 65A of the holder member 65 upward. The image sensor 20 is supported from below by the sensor support portion of the holder member 65. Accordingly, the image sensor 20 is biased toward the contact glass 16 by the biasing force of the springs 66 exerted on the holder member 65. That is, in the fourth embodiment, in the central portion in the main scanning direction of the image sensor 20, the biasing force of the springs 66 is exerted on the image sensor 20 via the holder member 65. Therefore, it is possible for the multifunction apparatus 1 with a small number of components to bias the image sensor 20 toward the contact glass 16 while keeping the same in a comparatively horizontal state.

Also in the fourth embodiment, the springs 66 are not positioned between the lower surface of the image sensor 20 and the sensor container 61. Accordingly, it is possible for the multifunction apparatus 1 to reduce the vertical dimension of the image sensor 20 and fourth carriage 60. Further, the springs 66 bias the image sensor 20 to the contact glass 16 via the biased portions 65A adjacent to the reading surface 21 of the image sensor 20 in the secondary scanning direction. Accordingly, the multifunction apparatus 1 can utilize the space in the fourth carriage 60 adjacent to the sensor container 61 in the secondary scanning direction to bias the image sensor 20 toward the contact glass 16. That is, it is possible for the multifunction apparatus 1 to facilitate miniaturization of the apparatus in the vertical direction and to bias the image sensor 20 toward the contact glass 16.

Further, as shown in FIG. 9, the two biased portions 65A of the holder member 65 are adjacent to the reading surface 21 of the image sensor 20 in the sensor container 61 in the left-right direction. The two biased portions 65A are biased upward by the springs 66. That is, according to the multifunction apparatus 1, it is possible to balance the biasing force of the springs 66 for the image sensor 20 in the left-right direction. Accordingly, it is possible to bias the reading surface 21 of the image sensor 20 toward the contact glass 16 in an appropriate state, i.e., being kept in a horizontal state with respect to the secondary scanning direction.

Fifth Embodiment

Next, referring to the relevant figures, explanations will be made in detail with respect to a fifth embodiment. A multifunction apparatus 1 according to the fifth embodiment basically has the same configuration with the multifunction apparatus 1 according to any of the first embodiment to the fourth embodiment, but differs in the configurations of the carriage and the holder member of the scanner unit 10. Hence, explanations will be made only for those differences in reference to the relevant figures, but omitted for the same configuration as in any of the first embodiment to the fourth embodiment.

Figure 10:
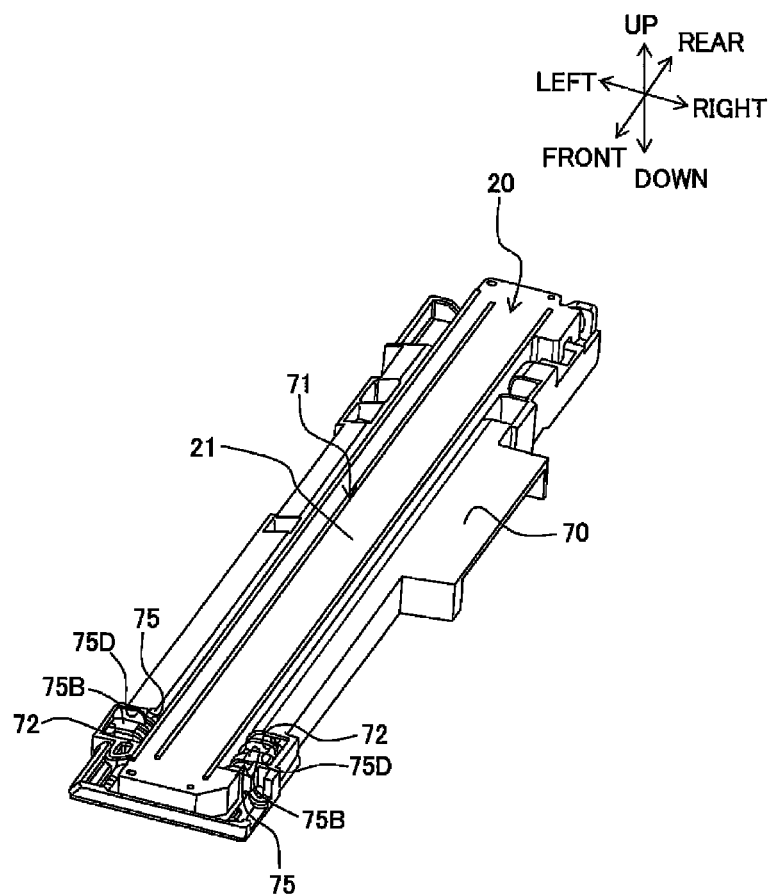
FIG. 10 is a perspective external view of the image sensor installed on a fifth carriage according to a fifth embodiment of the present invention.

Referring to FIGS. 10 and 11, explanations will be made in detail with respect to configurations of a carriage (to be referred to as a "fifth carriage 70" below) and a holder member 75 according to the fifth embodiment. Similar to the aforementioned first carriage 30, the fifth carriage 70 supports the image sensor 20 from below. The fifth carriage 70 supports the image sensor 20 to be slidable along the slide shaft 25 in the secondary scanning direction.

As shown in FIGS. 10 and 11, the fifth carriage 70 includes a sensor container 71 and spring attachment portions 72. The fifth carriage 70 extends in the front-rear direction of the multifunction apparatus 1. The sensor container 71 has an opening 71A and engagement holes 71B. The sensor container 71 has the same configuration with the sensor container 31 of the first carriage 30 in the first embodiment. Accordingly, explanations will be omitted for the configuration of the sensor container 71.

Further, the spring attachment portions 72 are formed in an end portion in the longitudinal direction of the fifth carriage 70 positioned on the front side of the multifunction apparatus 1. The spring attachment portions 72 are configured to be capable of attachment of the holder member 75 and springs 76. As shown in FIGS. 10 and 11, the spring attachment portions 72 are adjacent to the sensor container 71 and face each other in the secondary scanning direction of the multifunction apparatus 1 so that the sensor container 71 is sandwiched therebetween.

In the fifth embodiment, the holder member 75 supports the image sensor 20 contained in the sensor container 71 from below in the front end portion in the longitudinal direction of the image sensor 20. The holder member 75 holds the springs 76 between the holder member 75 and the spring attachment portions 72. As shown in FIG. 11, the holder member 75 has a sensor support portion 75A, biased portions 75B, locking hooks 75C, and spacer ribs 75D.

Since the sensor support portion 75A, the biased portions 75B and the locking hooks 75C of the holder member 75 have the same configurations with the sensor support portion 35A, the biased portions 35B and the locking hooks 35C of the aforementioned holder member 35 according to the first embodiment, respectively, their explanations will be omitted. Further, the aspect of attachment of the holder member 75 to the spring attachment portions 72 is the same as that of attachment of the holder member 35 in the first embodiment. Accordingly, the explanation for that aspect will also be omitted.

As shown in FIGS. 10 and 11, the spacer ribs 75D are ribs which projects upward to the contact glass 16 on the upper surfaces of the biased portions 75B. If the holder member 75 moves upward due to the biasing force of the springs 76, then the upper ends of the spacer ribs 75D come into contact with the lower surface of the contact glass 16. That is, according to the multifunction apparatus 1 of the fifth embodiment, by virtue of the spacer ribs 75D, it is possible to keep a distance between the reading surface 21 of the image sensor 20 retained by the holder member 75 and the lower surface of the contact glass 16 constantly, based on the projection amount of the spacer ribs 75D. As a result, the multifunction apparatus 1 can properly maintain the distance between the reading surface 21 of the image sensor 20 and a manuscript on the contact glass 16, and thereby it is possible to maintain the reading quality of the scanner unit 10.

The springs 76 are provided between the biased portions 75B of the holder member 75 and the spring attachment portions 72, respectively. The upper ends of the springs 76 make contact with the lower surfaces of the biased portions 75B. The lower ends of the springs 76 are retained on the spring attachment portions 72. As shown in FIG. 11, the upper ends of the springs 76 are positioned below the contact glass 16 and above the lower surface of the image sensor 20 contained in the sensor container 71. Further, the spring attachment portions 72 retaining the lower ends of the springs 76 are positioned above the lower surface of the image sensor 20 in the sensor container 71. Accordingly, between the biased portions 75B of the holder member 75 and the spring attachment portions 72, the springs 76 can bias the image sensor 20 upward along with the holder member 75.

As explained above, in the multifunction apparatus 1 of the fifth embodiment, on the end portion side of the fifth carriage 70, the two biased portions 75B constituting the holder member 75 are adjacent to the reading surface 21 of the image sensor 20 in the sensor container 71 in the left-right direction. Then, between the respective biased portions 75B and spring attachment portions 72, the springs 76 bias the biased portions 75B of the holder member 75 upward. Here, the image sensor 20 is supported from below by the sensor support portion 75A of the holder member 75. Accordingly, the image sensor 20 is biased toward the contact glass 16 by the biasing force of the springs 76 exerted on the biased portions 75B of the holder member 75.

As shown in FIG. 11, in the fifth embodiment, the springs 76 are not positioned between the lower surface of the image sensor 20 and the sensor container 71. Therefore, it is possible for the multifunction apparatus 1 to reduce the vertical dimension of the image sensor 20 and fifth carriage 70. Further, the springs 76 bias the image sensor 20 to the contact glass 16 via the biased portions 75B adjacent to the reading surface 21 of the image sensor 20 in the secondary scanning direction. Therefore, the multifunction apparatus 1 can utilize the space in the fifth carriage 70 adjacent to the sensor container 71 in the secondary scanning direction to bias the image sensor 20 toward the contact glass 16. That is, it is possible for the multifunction apparatus 1 to facilitate miniaturization of the apparatus in the vertical direction and to bias the image sensor 20 toward the contact glass 16.

Further, as shown in FIGS. 10 and 11, the two biased portions 75B of the holder member 75 are adjacent to the reading surface 21 of the image sensor 20 in the sensor container 71 in the left-right direction. The two biased portions 75B are biased upward by the springs 76. Further, the biased portions 75B have the spacer ribs 75D on their upper surfaces, respectively. Therefore, according to the multifunction apparatus 1, it is possible to balance the biasing force of the springs 76 for the image sensor 20 in the left-right direction. Further, by virtue of the spacer ribs 75D, it is possible for the multifunction apparatus 1 to keep a distance between the reading surface 21 of the image sensor 20 and the lower surface of the contact glass 16 constantly. Accordingly, it is possible to bias the reading surface 21 of the image sensor 20 toward the contact glass 16 in an appropriate state, i.e., being kept in a horizontal state.

In the fifth embodiment, the holder member 75 is attached to the front end portion of the fifth carriage 70 and the spacer ribs 75D are provided on the upper surfaces of the biased portions 75B of the holder member 75. However, a spacer rib may also be provided on the upper surface of the biased portion 45B of the holder member 45 in the second embodiment. Further, spacer ribs may also be provided on the upper surfaces of the biased portions 55A of the first holder member 55 and the biased portions 56A of the second holder member 56 in the third embodiment, respectively. Furthermore, spacer ribs may also be provided on the upper surfaces of the biased portions 65A of the holder member 65 in the fourth embodiment. In any of these cases, by virtue of the spacer ribs, it is possible to maintain a distance between the reading surface 21 of the image sensor 20 and the lower surface of the contact glass 16 constantly.

Based on the embodiments, the present invention was described hereinabove. However, the present invention is not limited to the embodiments described above, but can undergo various modifications and changes without departing from the gist and scope of the present invention. For example, in the above embodiments, an example is shown by the multifunction apparatus 1 having a scanner function, a photocopy function, a printer function, and a facsimile function. However, the present invention is not limited to this aspect. It is possible to apply the present invention to any scanner apparatuses or photocopy machines which at least have a scanner unit of the flatbed type.

Further, in the above embodiments, the biased portions are positioned to be adjacent to the reading surface of the image sensor in the secondary scanning direction. However, the present invention is not limited to this aspect. That is, the biased portions may alternatively be positioned to be adjacent to the reading surface of the image sensor in the main scanning direction.

Further, in the above embodiments, the biased portions of the holder member are biased upward by the springs so as to bias the image sensor supported by the holder member toward the contact glass. However, the present invention is not limited to this aspect. For example, in the upper portions of side surfaces of the image sensor, biased portions may be formed to extend horizontally in outward directions from the image sensor. In this case, by exerting the biasing force of the springs on the biased portions formed integrally with the image sensor, the image sensor may also be biased toward the contact glass.

That is, the biased portions of the present invention may be members which receive the biasing force of a biasing member at a position adjacent to the reading surface of the image sensor, and which exert the biasing force to bias the image sensor toward the contact glass. Accordingly, as described above, the biased portions of the present invention include those formed integrally with the image sensor. Further, as in each of the embodiments described above, it is a matter of course that the biased portions also include those formed in another members separate from the image sensor.

In the above embodiments, the spring attachment portions are formed in the end portion(s) or the central portion in the longitudinal direction of the carriage so as to attach the holder member and the springs. By virtue of this configuration, the image sensor 20 is biased toward the contact glass 16. However, the present invention is not limited to this aspect. For example, it may alternatively be configured that the image sensor 20 is biased toward the contact glass 16 by forming the spring attachment portions in both end portions and the central portion in the longitudinal direction of the carriage to attach the holder members and the springs in those three portions.

What is claimed is:

1. An image reading apparatus comprising:
a contact glass having an upper surface and a lower surface which are opposite to each other, the upper surface being configured to support a manuscript thereon;
an image sensor unit disposed below the contact glass and including:
an image sensor extending in a first direction and configured to read an image of the manuscript supported on the upper surface of the contact glass, the image sensor having an upper surface facing the lower surface of the contact glass, and a lower surface opposite to the upper surface; and
a retainment portion having a pivot axis which extends in the first direction and about which the image sensor unit is pivotable,
a carriage configured to carry the image sensor unit in a second direction perpendicular to the first direction, the carriage including a spring receiving portion;
a guide member extending in the second direction and configured to guide the carriage in the second direction; and
a spring configured to bias the image sensor unit toward the contact glass pivotally about the pivot axis of the retainment portion, the spring having a first end received by the spring receiving portion, and a second end in contact with the image sensor unit,
wherein the spring receiving portion of the carriage and the pivot axis of the retainment portion are offset from the image sensor in the second direction, and the pivot axis and at least a portion of the spring are located below the upper surface of the image sensor and above the lower surface of the image sensor.

2. The image reading apparatus according to claim 1, wherein the spring is closer to one end of the image sensor in the first direction than to the guide member.

3. The image reading apparatus according to claim 1, wherein the spring is a coil spring.

4. The image reading apparatus according to claim 1, wherein the image sensor unit further includes a biased portion in contact with the second end of the spring, the biased portion being offset in the second direction from the image sensor.

5. The image reading apparatus according to claim 1, wherein the spring receiving portion of the carriage and the pivot axis of the retainment portion are located opposite to each other in the second direction relative to the image sensor.

6. The image reading apparatus according to claim 1, wherein the image sensor unit further includes a holder member which supports the image sensor and includes the retainment portion, and the spring is configured to bias the holder member toward the contact glass pivotally about the pivot axis of the retainment portion.

7. The image reading apparatus according to claim 1, wherein the spring extends in a vertical direction.

8. The image reading apparatus according to claim 1, wherein the first end and the second end of the spring are located below the upper surface of the image sensor and above the lower surface of the image sensor.

9. An image reading apparatus comprising:
a contact glass having an upper surface and a lower surface which are opposite to each other, the upper surface being configured to support a manuscript thereon;

an image sensor unit disposed below the contact glass and including:
- an image sensor extending in a first direction and configured to read an image of the manuscript supported on the upper surface of the contact glass, the image sensor having an upper surface facing the lower surface of the contact glass, and a lower surface opposite to the upper surface; and
- a retainment portion having a pivot axis which extends in the first direction and about which the image sensor unit is pivotable, a carriage configured to carry the image sensor unit in a second direction perpendicular to the first direction, the carriage including a spring receiving portion;

a guide member extending in the second direction and configured to guide the carriage in the second direction; and a spring having a first end received by the spring receiving portion, and a second end configured to bias the image sensor unit toward the contact glass such that the image sensor unit pivots about the pivot axis of the retainment portion, wherein the spring receiving portion of the carriage and the pivot axis of the retainment portion are offset from the image sensor in the second direction, and the pivot axis and at least a portion of the spring are located below the upper surface of the image sensor and above the lower surface of the image sensor.

10. The image reading apparatus according to claim 9, wherein the spring is closer to one end of the image sensor in the first direction than to the guide member.

11. The image reading apparatus according to claim 9, wherein the spring is a coil spring.

12. The image reading apparatus according to claim 9, wherein the image sensor unit further includes a biased portion in contact with the second end of the spring, the biased portion being offset in the second direction from the image sensor.

13. The image reading apparatus according to claim 9, wherein the spring receiving portion of the carriage and the pivot axis of the retainment portion are located opposite to each other in the second direction relative to the image sensor.

14. The image reading apparatus according to claim 9, wherein the image sensor unit further includes a holder member which supports the image sensor and includes the retainment portion, and the spring is configured to bias the holder member toward the contact glass such that the holder member pivots about the pivot axis of the retainment portion.

15. The image reading apparatus according to claim 9, wherein the spring extends in a vertical direction.

16. The image reading apparatus according to claim 9, wherein the first end and the second end of the spring are located below the upper surface of the image sensor and above the lower surface of the image sensor.

\* \* \* \* \*